US008868585B2

(12) United States Patent
Miyajima et al.

(10) Patent No.: US 8,868,585 B2
(45) Date of Patent: *Oct. 21, 2014

(54) CONTENTS REPLAY APPARATUS AND CONTENTS REPLAY METHOD

(75) Inventors: Yasushi Miyajima, Kanagawa (JP);
Masamichi Asukai, Kanagawa (JP);
Mitsuru Takehara, Tokyo (JP);
Takatoshi Nakamura, Kanagawa (JP);
Yoichiro Sako, Tokyo (JP); Toshiro Terauchi, Tokyo (JP); Makoto Inoue, Tokyo (JP); Kosei Yamashita, Kanagawa (JP); Toru Sasaki, Tokyo (JP); Masafumi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 13/405,020

(22) Filed: Feb. 24, 2012

(65) Prior Publication Data

US 2012/0155832 A1 Jun. 21, 2012

Related U.S. Application Data

(63) Continuation of application No. 11/885,327, filed as application No. PCT/JP2006/302055 on Feb. 7, 2006, now Pat. No. 8,145,034.

(30) Foreign Application Priority Data

Mar. 2, 2005 (JP) .................. 2005-057010

(51) Int. Cl.
*G06F 17/30* (2006.01)
*G11B 27/10* (2006.01)
*H04N 5/92* (2006.01)
*H04N 5/907* (2006.01)
*H04N 5/781* (2006.01)
*H04N 5/85* (2006.01)
*H04N 5/765* (2006.01)

(52) U.S. Cl.
CPC .. *G06F 17/30038* (2013.01); *G11B 2220/2562* (2013.01); *H04N 5/907* (2013.01); *H04N 5/781* (2013.01); *H04N 5/85* (2013.01); *G11B 27/10* (2013.01); *G06F 17/30265* (2013.01); *H04N 5/9201* (2013.01); *H04N 5/765* (2013.01)
USPC .......................................... 707/758; 386/241

(58) Field of Classification Search
CPC .................. G06F 17/30038; G06F 17/30265; G11B 27/10
USPC .......................................... 386/241; 707/758
See application file for complete search history.

(56) References Cited

U.S. PATENT DOCUMENTS 5,459,829 A 10/1995 Doi et al.
5,493,677 A 2/1996 Balogh et al.
(Continued)

FOREIGN PATENT DOCUMENTS

EP 1422668 A 5/2004
EP 1431977 A 6/2004
(Continued)

OTHER PUBLICATIONS

Hunter, Jane, and Suzanne Little. "Building and indexing a distributed multimedia presentation archive using SMIL." Research and Advanced Technology for Digital Libraries. Springer Berlin Heidelberg, 2001. 415-428.*

(Continued)

*Primary Examiner* — Kambiz Zand
*Assistant Examiner* — Michael Guirguis
(74) *Attorney, Agent, or Firm* — Wolf, Greenfield & Sacks, P.C.

(57) ABSTRACT

To enable a lot of audio data and image data such as a still image and a moving image to be effectively and efficiently used. When audio data accumulated in a material database 21 is replayed, a controller 10 acquires the metadata added to the audio data to be replayed from the material database, refer to the metadata of image data based on the above metadata to thereby search image data intimately related to the audio data, controls a voice replay system such as an audio decoder 32 and the like and an image replay system such as an image decoder 31 and the like, and replay the audio data to be replayed and the searched image data in relation with each other.

19 Claims, 13 Drawing Sheets

(56) References Cited

U.S. PATENT DOCUMENTS

| | | | |
|---|---|---|---|
| 2004/0122539 A1* | 6/2004 | Ainsworth | 700/94 |
| 2006/0004914 A1 | 1/2006 | Kelly et al. | |
| 2006/0026159 A1 | 2/2006 | Dettinger et al. | |
| 2006/0095852 A1* | 5/2006 | Trepess et al. | 715/741 |

FOREIGN PATENT DOCUMENTS

| | | |
|---|---|---|
| JP | 04-115788 | 4/1992 |
| JP | 08-110911 | 4/1996 |
| JP | 09-288681 | 11/1997 |
| JP | 3034925 B2 | 2/2000 |
| JP | 2000-076000 A | 3/2000 |
| JP | 2003-030219 A | 1/2003 |
| JP | 2004-328393 A | 11/2004 |
| JP | 2004-355280 A | 12/2004 |

OTHER PUBLICATIONS

Casares et al. "Simplifying Video Editing Using Metadata" In Proceedings of Designing Interactive Systems (DIS 2002), London, UK, Jun. 2002. pp. 157-166.

* cited by examiner

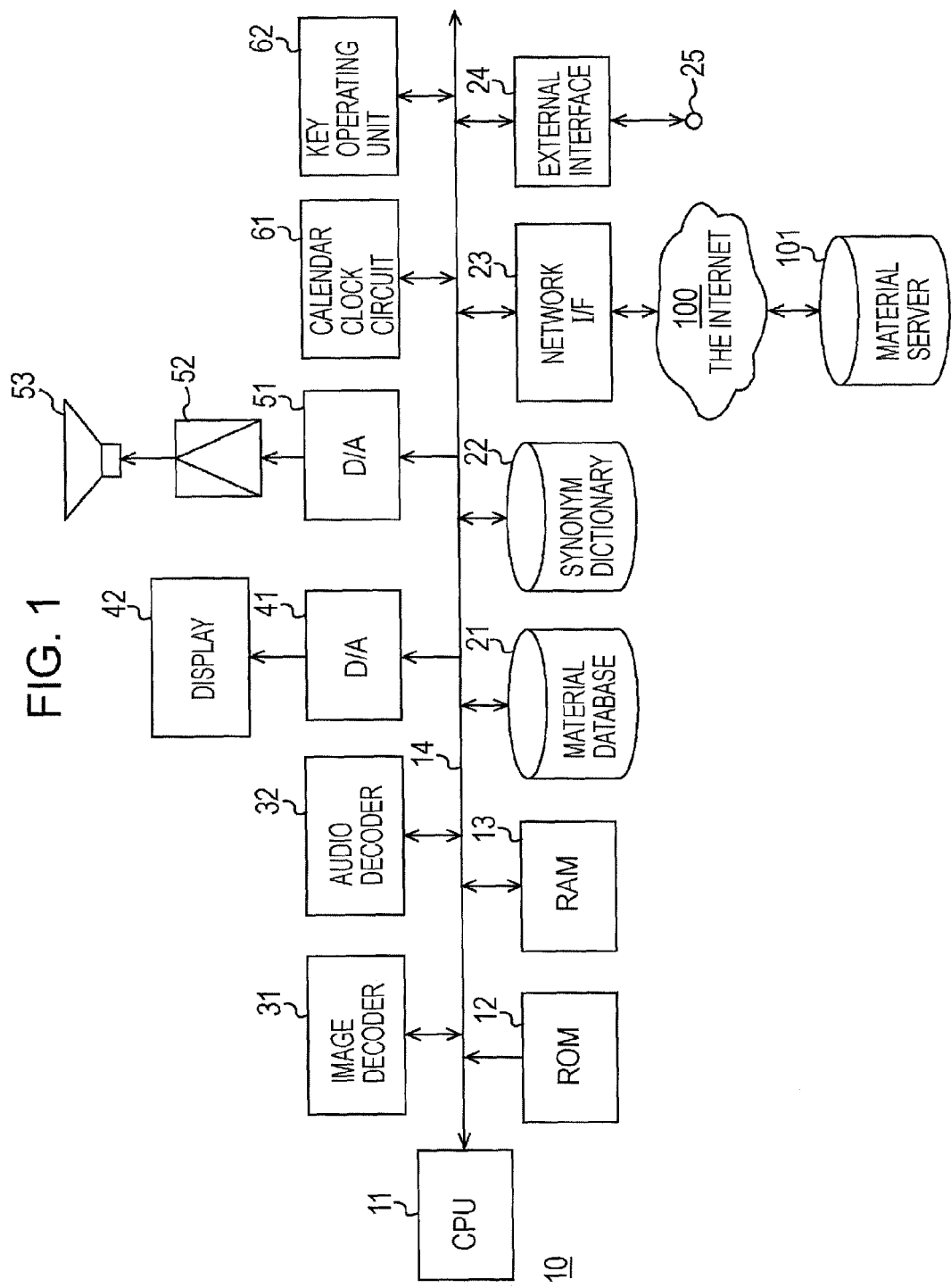

PHOTOGRAPHING TIME AND DATE: 13:20, AUGUST 9, 2003
SECOND TIME AND DATE: APRIL TO OCTOBER, 1970
PLACE: OSAKA, OUTDOOR
STATUS: TRAVEL
WEATHER: FINE
PHOTOGRAPHER: ○○○○
ACCOMPANYING PERSON: △△△△
DEGREE OF RELATION TO INDIVIDUAL: 1
CATEGORY: ART > OBJET D'ART
CONTENTS: OSAKA WORLD EXPO, TOWER OF □□
KEYWORD: OSAKA, WORLD EXPO, TOWER OF □□, MR.○○, PARK,
         OBJET D'ART, ···

FIG. 2B

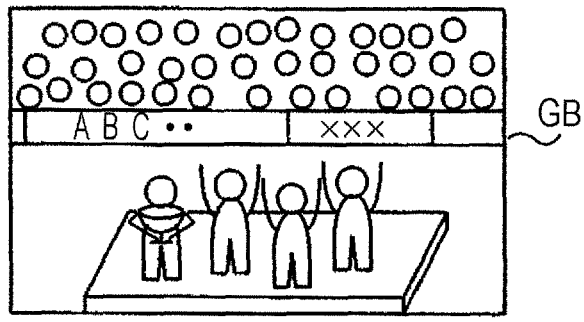

PHOTOGRAPHING TIME AND DATE: 20:45, JUNE 30, 2002
SECOND TIME AND DATE: N/A
PLACE: YOKOHAMA, OUTDOOR
STATUS: SPORTS-WATCHING
WEATHER: CLOUDY
PHOTOGRAPHER: MR.○○○
ACCOMPANYING PERSONS: MS. ○○○□, MS. ○○○△
DEGREE OF RELATION TO INDIVIDUAL: 2
CATEGORY: EVENT > SPORTS
CONTENTS: SOCCER, WORLD CUP, FINAL, AWARDING CEREMONY
KEYWORDS: YOKOHAMA, SOCCER, WORLD CUP, BRAZIL, AWARDING
CEREMONY, HONOR, SPORTS, GALLERY, EXCITEMENT,
EXULTANT SHOUT, STADIUM, ···

PHOTOGRAPHING TIME AND DATE: 19:00, APRIL 24, 2004
SECOND TIME AND DATE: N/A
PLACE: TOKYO, INDOOR
STATUS: ATTENDANCE TO EVENT
WEATHER: N/A
PHOTOGRAPHER: N/A
ACCOMPANYING PERSONS: △△△△ ◻◻◻◻ ××××
DEGREE OF RELATION TO INDIVIDUAL: 3
CATEGORY: EVENT > BRIDAL
CONTENTS: MR.○○'S BRIDAL
KEYWORD: BRIDAL, PARTY, HAPPINESS, HAPPY, ···

RELEASE DATE: AUGUST 4, 1981
COUNTRY: USA
ARTIST: XXXXXXX
ALBUM NAME: YYYYY
MUSIC NAME: ZZZZZ
GENRE: JAZZ
LANGUAGE: NIL
SITUATION: RELAX, ALONE, NIGHT
CONTENTS: DEBUT ALBUM OF XXXXXXX, CHALLENGING WORK
                WHICH BECOMES NO. 1 IN USA IN A MOMENT
KEYWORDS: SUMMER, NIGHT, MELLOW, NOSTALGIA, COUNTRYSIDE

RELEASE DATE: NOVEMBER 20, 2003
COUNTRY: JAPAN
ARTIST: LLLLLL
ALBUM NAME: MMMM
MUSIC NAME: NNN
GENRE: ROCK
LANGUAGE: JAPANESE
SITUATION: PARTY, OUTDOOR, NOON
CONTENTS: NICE ROCK MMMM OF LLLLLL
KEYWORD: RHYTHMICAL, AGITATO, AGITATION, PARTY, TRIUMPH

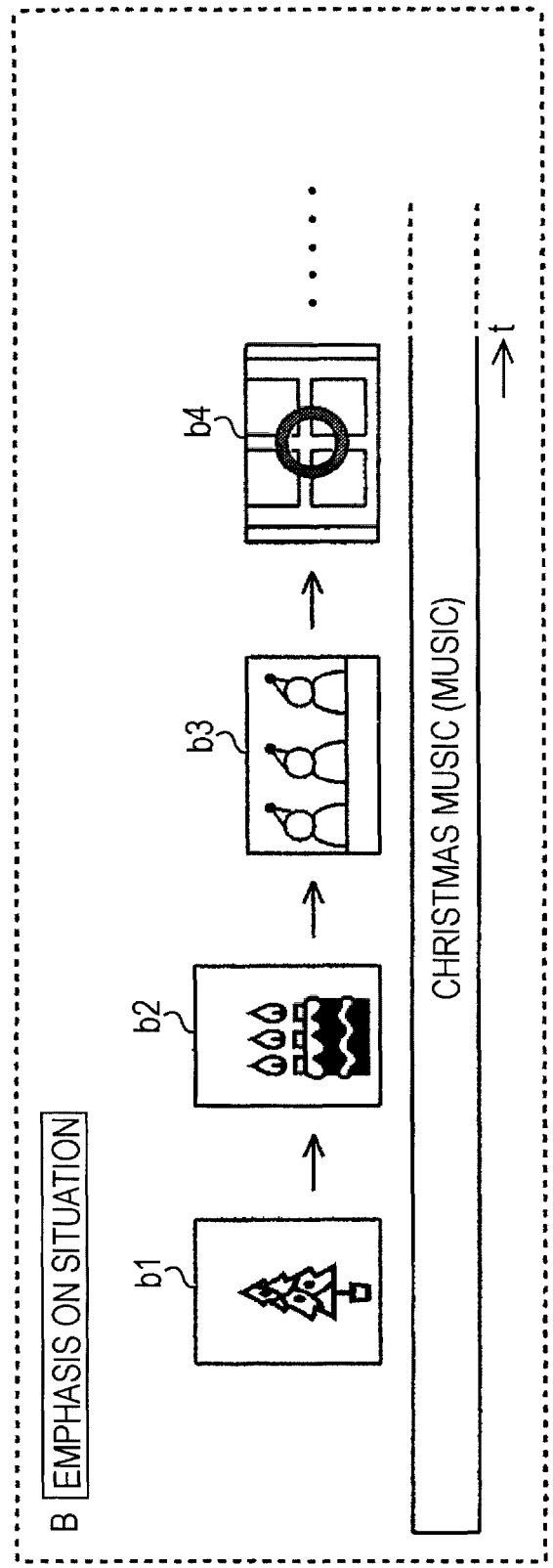

CONTENTS REPLAY APPARATUS AND CONTENTS REPLAY METHOD

CROSS REFERENCES TO RELATED APPLICATIONS

This application is a continuation of U.S. patent application Ser. No. 11/885,327, titled "CONTENTS REPLAY APPARATUS AND CONTENTS REPLAY METHOD", filed on Apr. 25, 2008, now U.S. Pat. No. 8,145,034, which is a national stage filing under 35 U.S.C. §371 of International Patent Application No. PCT/JP2006/302055, filed Feb. 7, 2006, which claims the foreign priority benefit under 35 U.S.C. §119 (a)-(d) or §365(b) of Japanese Patent Application No. 2005-057010, filed Mar. 2, 2005. The contents of these applications are hereby incorporated by reference in their entireties.

TECHNICAL FIELD

The present invention relates to an apparatus for and a method of replaying, for example, audio data and image data such as still images and moving images.

BACKGROUND ART

Various audio data such as music data and the like are presented through various types of recording mediums or networks such as The Internet and the like and accumulated in information processing apparatuses such as personal computers and the like for use. Further, image data such as still images and moving images picked up through digital still cameras, digital video camera, and the like are also accumulated in the information processing apparatuses such as the personal computers and the like for use, in addition to the audio and image data presented through the recording mediums and the networks.

As described above, recently, the audio data and the image data accumulated in the information processing apparatuses such as the personal computers and the like have significantly increased. Further, a lot of various sound and image contents can be used on The Internet. However, the audio data and the image data acquired through a different path or at a different timing are ordinarily handled as data which are completely independent of each other regardless that they can be accessed from the same information processing apparatus.

That is, ordinarily, when a target audio data is replayed, only the target audio data can be replayed, and when a target image data is replayed, only the target image data can be replayed except a so-called AV (audio video) data such as TV broadcast programs, movie contents, and the like in which audio data and moving image data are replayed in synchronism with each other.

Recently, there has been proposed an apparatus that can carry out a so-called slideshow display (slideshow replay) for replaying the images which are arbitrarily selected from a plurality of images displayed in thumbnail format in an arbitrary order as disclosed in, for example, Japanese Unexamined Patent Application Publication No. 2003-288068 which will be described later. Further, it is also contemplated to add BGM when the so-called slideshow is replayed by designating audio data to be explicitly replayed by a user.

Incidentally, in a system for carrying out the so-called slideshow replay, a plurality of still image data recorded to a predetermined file and a plurality of still image data designated by a user are ordinarily used as a target to be replayed and further audio data recorded to a predetermined file and audio data designated by the user are ordinarily used as a target to be replayed.

However, a lot of audio data and image data is accumulated in the information processing apparatuses such as the personal computer and the like as described above, and further a lot of audio data and image data can be used through the networks such as The Internet and the like. Accordingly, there is a request for effectively and efficiently use the lot of usable audio data and image data.

Specifically, if it is possible to simply and securely select and display a still image suitable for music to be replayed and to add BGM (background music) optimum to still images to be sequentially displayed, the accumulated music data and image data can be effectively and efficiently utilized.

In view of what has been described above, an object of the present invention is to provide an apparatus for and a method of effectively and efficiently using audio data such as music and a spoken voice and image data such as still images and moving images that can be used.

DISCLOSURE OF THE INVENTION

To solve the above object, a contents replay apparatus of the invention according to claims 1 and 2 is characterized by comprising:

a metadata acquisition means for acquiring the metadata added to audio data to be replayed;

a search means for searching image data intimately related to the audio data referring to the metadata added to the image data of a still image or a moving image based on the metadata acquired by the acquisition means;

an audio replay means for replaying the audio data;

an image replay means for replaying the image data searched by the search means; and a control means for controlling the audio replay means and the image replay means so that a sound and an image to be replayed are replayed in relation to each other.

According to the contents replay apparatus of claims 1 and 2, the metadata added to the audio data to be replayed is acquired by the acquisition means, the metadata added to image data is referred to based on the metadata, and image data intimately related to the audio data is searched by the search means. Then, the audio replay means and the image replay means are controlled by the control means, and the audio data to be replayed and the image data searched by the search means are replayed in relation to each other.

With this arrangement, image data related to the audio data to be replayed can be automatically searched while omitting a troublesome job and a time required to the user who searches the image data related to the audio data to be replayed, and the image data can be replayed in correspondence to replay of the target audio data. Accordingly, a lot of audio data such as music and spoken voices and the image data of still images and moving images, which are placed in a usable state, can be effectively and efficiently utilized.

Further, a contents replay apparatus of the invention according to claims 1 and 3 is characterized by comprising:

an acquisition means for acquiring the metadata added to the image data of a still image or a moving image to be replayed;

an audio replay means for replaying the audio data searched by the search means; and a control means for controlling the image replay means and the audio replay means so that an image and a sound to be replayed are replayed in relation to each other.

According to the contents replay apparatus of claims 1 and 3, the metadata added to the image data to be replayed is acquired by the acquisition means, the metadata added to audio data is referred to based on the metadata, and audio data intimately related to the image data is searched by the search means. Then, the image replay means and the audio replay means are controlled by the control means, and the image data to be replayed and the audio data searched by the search means are replayed in relation to each other.

With this arrangement, audio data related to the image data to be replayed can be automatically searched while omitting a troublesome job and a time required to the user who searches the audio data related to the image data to be replayed, and the audio data can be replayed in correspondence to replay of the target image data. Accordingly, the image data of still images and moving images and a lot of audio data such as music and spoken voices, which are placed in a usable state, can be effectively and efficiently utilized.

According to the invention, the user can effectively and efficiently utilize the image data of still images and moving images and the lot of audio data such as music and spoken voices which are placed in a usable state without the troublesome job.

BRIEF DESCRIPTION OF THE DRAWINGS

FIG. 1 is a block diagram explaining a contents replay apparatus to which an embodiment of an apparatus and a method of the present invention is applied.

FIG. 2B is a view explaining image data which can be used by the contents replay apparatus shown in FIG. 1 and an example of metadata added to the image data.

FIG. 4B is a view explaining an example of the contents replay mode of the contents replay apparatus shown in FIG. 1.

BEST MODE FOR CARRYING OUT THE INVENTION

Figure 2A:
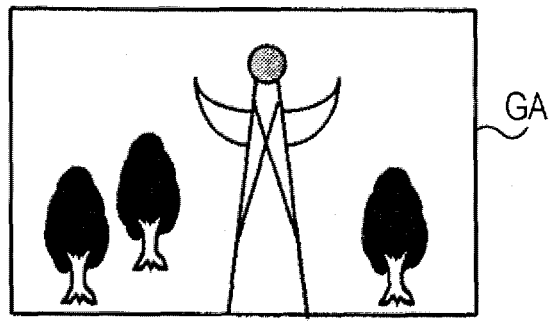
FIG. 2A is a view explaining image data which can be used by the contents replay apparatus shown in FIG. 1 and an example of metadata added to the image data.

An embodiment of an apparatus and a method of the present invention will be explained below with reference to the figures. In the embodiment described below, there will be explained a case in which the apparatus and the method of the present invention are applied to an apparatus, for example, a personal computer, a note type personal computer, a mobile phone terminal, a mobile information terminal, and the like provided with an audio and image data replay function (hereinafter, called a contents replay apparatus).

The contents replay apparatus of the embodiment, which will be explained below, is arranged so that audio data, photograph data (still image data), and moving image data are added with metadata as by year, month and day and a region in which the data were created, offering a degree of relationship to the user, detailed contents, and the like. When music data is replayed, a photograph picked up by the user, a photograph in which the user is printed, a topical photograph, and the like related to the time when the music was popular can be automatically displayed without bothering the user by making use of the metadata.

On the contrary, when still image data is replayed as, for example, a so-called slideshow or when moving image data is replayed, the metadata permits music data of music suitable for the image data, which is to be replayed, to be automatically selected and replayed as BGM without bothering the user.

Note that the metadata added to audio data and image data is data showing the attribute, the meanings, and contents of main data such as the audio data and the image data added with the metadata, and the metadata is intrinsically added to manage the main data.

[As to Contents Replay Apparatus]

FIG. 1 is a block diagram explaining a contents replay apparatus to which an embodiment of an apparatus and a method of the present invention is applied. As shown in FIG. 1, the contents replay apparatus of the embodiment includes a controller 10, a material database 21, a synonym dictionary 22, a network interface (hereinafter, abbreviated as network I/F) 23, an external interface (hereinafter, abbreviated as external I/F) 24, an external input/output terminal 25, an image decoder 31, an audio decoder 32, a video D/A converter 41, a display 42, an audio D/A (digital/analog) converter 51, an audio amplifier 52, a speaker 53, a calendar clock circuit (hereinafter, called a clock circuit) 61, and a key operating unit 62.

The controller 10 controls the respective units of the contents replay apparatus of the embodiment and is a microcomputer in which a CPU (Central Processing Unit) 11, a ROM (Read Only Memory) 12, and a RAM (Random Access Memory) 13 are connected to each other through a CPU bus 14 as shown in FIG. 1.

The CPU 11, which is mainly in charge of control, creates a control signal to be supplied to the respective units by carrying out various types of arithmetic operations by executing programs and supplies the control signal to a target unit. The ROM 12 stores the programs executed by the CPU 11 and various types of data necessary to processings. The RAM 13 is mainly used as a job region (working area) for temporarily storing a result of a processing while the processing is being carried out.

The material database 21 includes a recording medium having a relatively large capacity and stores audio data (audio material) such as music and a spoken voice to be replayed by the contents replay apparatus, metadata accompanying with the audio data, and image data (image material) such as a still image, a moving image, and the like and metadata accompanying with the image data.

Although various types of recording mediums, for example, optical discs such as a CD, a DVD, and the like, magnetic optical discs such as an MD (Mini Disc (registered trade mark of Sony)) and the like, and magnetic discs such as a semiconductor memory, a hard disc, and the like are used as a recording medium used in the material database 21, the embodiment will be explained assuming that a hard disc is used as the material database 21. That is, the material database 21 corresponds to a hard disc drive which includes the hard disc and to and from which various types of data as described above can be recorded and read out.

The synonym dictionary 22 includes a recording medium having a relatively large capacity likewise the material database 21 and stores synonym dictionary data. Although various recording mediums such as an optical disc, a magnetic optical disc, a semiconductor memory, a hard disc, and the like may be used as a recording medium used in the synonym dictionary 22 likewise the material database 21, the synonym dictionary 22 of the embodiment also employs a hard disc having a function as a hard disc drive.

Note that, in the embodiment, the material database 21 and the synonym dictionary 22 are recorded on different hard discs as shown in FIG. 1 to make explanation simple. However, it is needless to say that they may be recorded in the different storage regions on the same hard disc. Further, the material database 21 may be formed on a hard disc drive, and the synonym dictionary may be formed on other recording medium such as a semiconductor memory, a CD-ROM, and the like. In this case, the synonym dictionary 22 corresponds to a semiconductor memory drive and a CD drive.

In the embodiment, the network I/F 23 is connected to The Internet 100 so that data can be transmitted to and received from a server apparatus and the like on The Internet. Accordingly, the contents replay apparatus of the embodiment accesses to a material server 101 and the like connected onto The Internet 100 through the network I/F 23 and The Internet so that it can be supplied with and replay various types of audio data and image data and can register the audio data and image data supplied thereto to the material database 21.

That is, the contents replay apparatus of the embodiment can also acquire materials such as still image data such as a photograph and the like, moving image data, music data, and the like prepared by a third party through the networks such as The Internet and the like and replay the materials, in addition to the material stored in the local material database 21.

The external I/F 24 forms a communication path between, for example, an external personal computer and contents replay apparatus so that a communication is carried out therebetween, and the external input/output terminal 25 permits external equipment to be connected to the contents replay apparatus. With this arrangement, it is possible to present data to the external equipment connected to the external input/output terminal 25 or to receive necessary data from the external equipment and to use it.

Further, the image decoder 31 forms image data for replay by subjecting image data to be replayed to a compression/decompression processing so that the image data is restored to a state before it is compressed. The image data decoded by the image decoder 31 is supplied to the D/A converter 41 and converted into an analog image signal, and the analog image signal is supplied to the display 42, thereby an image according to the image data to be replayed is displayed on a display screen of the display 42.

Note that the display 42 is an image display unit including a display device, for example, an LCD (Liquid Crystal Display), a PDP (Plasma Display Panel), an organic EL (Electro Luminescence) display, a CRT (Cathode-Ray Tube) display, and the like, and the LCD, for example, is employed in the contents replay apparatus of the embodiment.

The audio decoder 32 forms audio data for replay by subjecting audio data to be replayed to a compression/decompression processing so that the audio data is restored to a state before it is compressed. The audio data decoded by the audio decoder 32 is supplied to the audio D/A converter 51 and converted into an analog audio signal, and the analog audio signal is supplied to a speaker 53 through the audio amplifier 52, and a sound according to the audio data to be replayed is output from the speaker 53.

Note that the functions of the image decoder 31 and the audio decoder 32 described above may be also realized by software executed by the controller 10.

The clock circuit 61 provides the present year, month, and date, the present day of the week, and the present time and can be also used to calculate a difference between the present date and the information as to the date of metadata added to contents data such as audio data, image data, and the like, which will be explained later in detail.

Further, the key operating unit 62 has many operation keys, for example, numerical keys, various function keys, and the like and can supply an electric signal to the controller 10 in response to an instruction from the user. With this arrangement, the controller 10 can control the respective units in response to the instruction from the user.

Note that it is possible to realize a function similar to the key operating unit 62 by disposing a touch panel on the display screen of the display 42 and forming a coordinate transformation circuit for converting the positions on the touch panel, which come into contact with fingers and the like of the user, into data, and further it is possible to realize a function similar to the key operating unit 62 by using, for example, a pointing device called a mouse.

The contents replay apparatus of the embodiment having the arrangement described above using FIG. 1 accumulates the contents data such as audio data, still image data, moving image data, and the like acquired from the material server 101 through The Internet 100 and the network I/F 23 and the contents data such as audio data, still image data, moving image data, and the like acquired from the external equipment through the external input/output terminal 25 and the external I/F 24 to the material database 21.

Then, the content replay apparatus reads out contents data from the material database 21 in response to an instruction input from the user through the key operating unit 62. When the contents data is still image data and moving image data, it is replayed through the image decoder 31, the video D/A converter 41, and the display 42, whereas when the contents data is audio data, it is replayed through the audio decoder 32, the audio D/A converter 51, the audio amplifier 52, and the speaker 53.

Further, as described later in detail, various types of metadata are added to usable contents data such as audio data, still image data, moving image data, and the like. Accordingly, when the contents replay apparatus of the embodiment replays audio data, it can search and extract image data related to the audio data making use of the metadata added to the usable contents data and can replay the image data in parallel with the replay of the audio data, and when the contents replay apparatus replays image data, it can search and extract audio data related to the image data making use of the metadata and can replay the audio data in parallel with the replay of the image data.

When, for example, the contents replay apparatus replays audio data, it can automatically search still image data and moving image data related to the audio to be replayed from the material database 21, the material server 101 on The Internet 100, and the recording medium of the external equipment connected thereto through the external I/F 24 and display the still image data and moving image data. Further, when the contents replay apparatus replays still image data and moving image data, it can also automatically search audio data related to the image data to be replayed from the material database 21, the material server 101 on The Internet 100, and the recording medium of the external equipment connected thereto through the external I/F 24 and replay the audio data.

Although the respective contents are searched here based on the metadata added to the contents, image data and audio data can be searched using also synonyms according to metadata by using not only the already added metadata but also the synonym dictionary 22.

Note that when metadata is previously added to the respective contents data, the metadata can be acquired together with the contents data. Further, when metadata is not previously added to the respective contents data, the user can add the metadata to the contents data by inputting the metadata through the contents replay apparatus and the like.

Further, metadata to be added to target contents data can be acquired from an external apparatus, a metadata server on The Internet 100, and the like and can be added to the target contents data in the contents replay apparatus of the embodiment, separately from the above contents data.

[As to Details of Metadata]
[As to Metadata of Image Data]

First, metadata added to image data such as still image data and moving image data will be explained. The metadata added to the image data acts as a data group for searching an image formed by the image data according to the metadata added to audio data. There is prepared a field of keywords for registering free words so that a free sentence can be registered, in addition to a predetermined field.

Figure 2C:
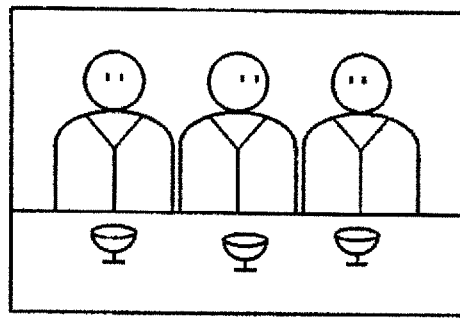
FIG. 2C is a view explaining image data which can be used by the contents replay apparatus shown in FIG. 1 and an example of metadata added to the image data.

FIG. 2A to FIG. 2C are views explaining examples of image data (still image data) and metadata added to the image data. Each of FIGS. 2A, 2B, and 2C shows an example of a still image resulting from different still image data and metadata added to the still image data. In FIGS. 2A, 2B, and 2C, images GA, GB, GC show images resulting from the respective still image data.

The image GA of FIG. 2A was picked up in travel, the image GB of FIG. 2B was picked up when a soccer match was watched, and FIG. 2C was packed up in a bridal party. As shown in FIG. 2A to FIG. 2C, the respective image data are added with metadata composed of items such as a photographing time and date, a second time and date (age meant by a subject), a place, a situation (situation in photographing), a weather in photographing, a photographer, an accompanying person, a degree of relationship to the user, a category, contents of a photograph, keywords for search, and the like. The respective items of the metadata added to the image data will be explained below.

"Photographing time and date" is information showing the year, month, and date on which a pertinent image data was picked up. It is possible for the user to input "photographing time and date" to respective still image data by the user and it is also possible to use information of photographing time and date presented by a clock circuit of a camera by which a pertinent still image was picked up.

"Second time and date" is information showing the age meant by a subject and the like. That is, when a subject has important time information regardless of a photographing time and date, the time information is input. When, for example, a subject is an objet d'art, a monument, and the like used in a famous event such as Tower of Sun which was disclosed as a symbol of Osaka World Expo, the period during which the event was held is added to the still image data as the "second time and date" independently of the photographing time and date. "Second time and date" can be also input by the user.

"Place" is information showing a place where a subject was picked up. When image data was picked up by a camera on which a GPS (Global Positioning System) was mounted, the latitude/longitude information showing the present position acquired by the GPS in photographing can be used. Further, it is also possible to specify a country and an area from the latitude/longitude information and to use the information showing them as information showing "place". Further, information that shows whether a place is indoor or outdoor is also recorded at the same time as the information showing "place". Note that "place" can be also input by the user.

"Situation" is information showing a situation when photographing was carried out. "Situation" is information showing, for example, during walking, attendance to an event, watching of sports and a play, during a date, in travel, and the like. It is preferable to previously prepare candidates (alternatives) of the information showing a plurality of "situations" so that the user can select a situation from the candidates in order to put emphasis on the accuracy of search of the information. More detailed information can be also input to the field of "keywords" or "contents" to be described later.

Information showing "weather" shows a weather in photographing such as fine, cloudy, rain, snow, storm, snow storm, thunder, hail, and the like. It is preferable to previously prepare candidates (alternatives) showing the information of a plurality of "weathers" likewise "situation" so that the user can select a weather from the candidates in view of accuracy of search.

"Photographer" is the information showing the name of a photographer or the name of an institute (the name of a firm). "Accompanying person" is the information showing the name of a person or the name of an institute (the name of a firm) accompanying a photographer. The information is input by the user. Note that a plurality of pieces of information may be input as to "accompanying person". As "degree of relationship to the user", numerical information is input to show a degree of relationship of an image formed by a pertinent image data to the user.

The numerical information showing the degree of relationship to the user includes, for example:

0: an image which is not related to the user at all;

1: an image in which a place and an article known by the user are photographed although they less relate to the user;

2: a photograph picked up by the user or an image of a place where the user has been visited; and 3: an image in which the user is photographed as a subject or an image in which a lover or a family of the user is photographed. It is possible for the user to select a numerical value which is determined to be pertinent by the subjective evaluation of him or her and to use the numerical value as the information showing the degree of relationship of the image data to the user.

"Category" shows a predetermined range for classifying a still image formed by still image data. "Category" is composed of a large category and a small category under the large category or a medium category and a small under the large category. Although these categories can be fundamentally set optionally, it is preferable to select the categories from previously prepared candidates (alternatives) of the categories in view of accuracy and efficiency of search.

There are prepared, for example, the following classification. That is, there are prepared a lot of large categories and a plurality of small categories following to the large categories so that the user can select and add them as shown below:

(large category) landscape>(small category) sea, mountain, urban area, country side, monument, shrine, . . . .

(large category) art>(small category) objet d'art, painting, play, music, photograph, . . . . In this case, the information of the large category and the small category can be set by selecting the information of a target small category in the large category.

Further, "contents" show the contents of a still image formed by a pertinent still image data, and "keywords" are various types of keywords for carrying out search as to the still image formed by the still image data. These "contents" and "keywords" can be added with a plurality of pieces of information and, they are so-called free word input items to which the user can optionally input words.

Note that, in the respective items of the metadata described above, it is also possible to set or input a plurality of pieces of information to the items other than the items such as "contents", "keyword", and "accompanying person". As described above, the metadata added to image data is composed of a plurality of items, and the respective items can be provided with has at least one piece of information.

In the example shown in FIG. 2A, since the image GA was picked up in travel as described above, information showing "photographing time and date" (13:20, Aug. 9, 2003) is added as metadata and further information showing a period of Osaka World Expo (April to October, 1970) is also added because a subject of the image GA is Tower of □□ exhibited in the site of Osaka World Expo as metadata.

Further, in the example shown in FIG. 2A, still image data is added with "place" (Osaka, outdoor), "situation" (travel), "weather" (fine), "photographer" (○○○○), and "accompanying person" (△△△△) as metadata as shown in FIG. 2A as well as with a numerical value "1" according to the example described above as information showing "degree of relationship to the user" and further with the respective pieces of information of "category", "contents", and "keywords" as metadata.

Further, in the example shown in FIG. 2B, since the image GB was packed up during watching of the soccer match as described above, information showing "photographing time and date" (20:45, Jun. 30, 2002) is added as metadata. Further, in the still image shown in FIG. 2B, there is no particular information showing "second time and date", "second time and date" is not added. In FIG. 2A to FIG. 2C, N/A (Not Applicable) means that there is no pertinent data. As described above, it is not necessary to forcibly input information as to a non-relevant item.

Further, in the example shown in FIG. 2B, the still image data is added with respective pieces of information of "place" (Yokohama, outdoor), "situation" (watching), "weather" (cloudy), "photographer" (Mr. ○○○) and "accompanying persons" (Ms. ○○○□, Ms. ○○○△) as shown in FIG. 2B as well as with a numerical value "2" according to the example described above as information showing "degree of relationship to the user" and further with the respective pieces of information of "category", "contents", and "keyword".

Further, in the example shown in FIG. 2C, since the image GC was picked up when the user attended at the bridal party as described above, information showing "photographing time and date" (19:00, Apr. 24, 2004) is added as metadata. Further, in the still image shown in FIG. 2B, since there is no particular information showing "second time and date", "second time and date" is not added.

Further, in the example shown in FIG. 2C, the still image data is added with "place" (Tokyo, indoor) and "situation" (attendance to event) as shown in FIG. 2C, and since there is no particular information as to "weather" and "photographer", no information is added. Further, "accompanying persons" (△△△△, □□□□, xxxx) are added as metadata as well as a numerical value "3" is added as the information showing "degree of relationship to the user" according to the example described above and further the respective pieces of information of "category", "contents", and "keywords" are added.

As described above, the respective still image data acquired by photographing are added with the respective metadata as shown in FIG. 2A to FIG. 2C, thereby target still image data can be properly searched and related to other contents data, for example, audio data.

Note that although the case shown in FIG. 2A to FIG. 2C is shown as an example in which the image data is the still image data, the present invention is not limited to the case. That is, metadata may be added to each photographing unit (file unit) of the moving image data which was picked up by the user using a digital video camera and used likewise the case of the still image data described above.

Further, metadata may be added even to still image data and moving image data created a producer other than the pertinent individual and used likewise the example described above using FIG. 2A to FIG. 2C as long as it is admitted to use the data personally, in addition to the image data photographed by the pertinent individual.

Note that, in the still image data and the moving image data created by the other producer, when metadata to be added thereto is previously prepared by the other producer and the still image data and moving image data is received through the external I/F 24 and the external input/output terminal 25 or through The Internet 100 connected through the network I/F 23, the metadata to be added to the received image data can be also received.

Further, the still image data, the moving image data, and the like created by the other producer is caused to correspond to the metadata added thereto by a relation of 1:1 by predetermined identification information (identification ID). The image data, which is already accumulated in the material database 21 and which is not added with metadata, can be provided with only the metadata of target image data using the identification information through the external I/F 24 and the external input/output terminal 25 or through The Internet 100 connected through the network I/F 23 so that the metadata can be added to the image data accumulated in the material database 21.

Note that moving image data such as a cinema, a drama, an animation, and the like and still image data picked up by a professional cameraman are contemplated as an example of the still image data, the moving image data, and the like created by the other creator.

[As to Metadata of Audio Data]

Next, metadata to be added to audio data such as music and a spoken voice will be explained. The metadata to be added to the audio data is a data group for searching a sound according to the audio data according to the metadata added to image data. There is prepared a field of keywords so that a free sentence can be input thereto, in addition to a predetermined field, likewise the case of the metadata added to image data.

Figure 3A:
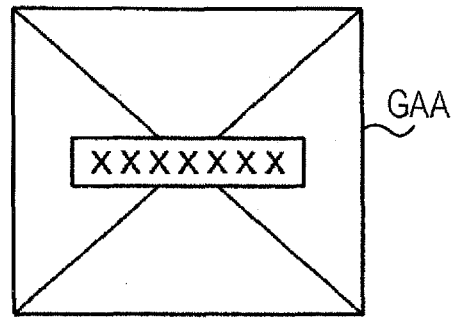
FIG. 3A is a view explaining image data which can be used by the contents replay apparatus shown in FIG. 1 and an example of metadata added to the image data.
Figure 3B:
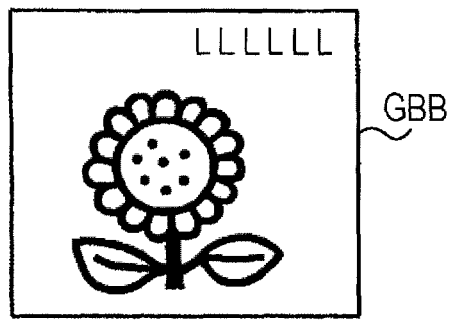
FIG. 3B is a view explaining image data which can be used by the contents replay apparatus shown in FIG. 1 and an example of metadata added to the image data.

FIGS. 3A and 3B are views explaining an example of audio data and metadata added to the audio data. Each of FIGS. 3A and 3B shows an example of the audio data (contents data) of music of a different artist and metadata added to the audio data. In FIGS. 3A and 3B, each of images GAA and GBB is an image resulting from still image data corresponding to the audio data thereof and used as the still image of the jacket of an album to which the audio data is recorded.

As shown also in FIGS. 3A and 3B, audio data that forms music and the like is added with metadata composed of items such as a release date, a release country, an artist name, an album name, a title, a genre, a language, a situation, contents, a keyword for search, and the like of the audio data. The respective items of the metadata added to the audio data will be explained below.

"Release date" is the information showing a date on which a sound such as music and the like presented by the audio data is released in a market.

"Release country is the information showing the country in which the sound such as the music and the like presented by the audio data is released or the information showing the nationality of an artist of the music and the like resulting from the audio data.

"Artist name" is the information showing the name of the artist who plays the music and the like presented by the audio data or the name of an orchestra playing the music and the like.

"Album name" is the information showing the name of an album to which the music and the like resulting from the audio data is recorded.

"Title" is the information showing the title (music name and the like) of the music and the like presented by the audio data.

"Genre" is the information showing the genres, for example, jazz, rock, classic, ..., and the like to which the music and the like presented by the audio data belong. It is preferable for the user to simply select a genre from the previously prepared information showing the genres and to add it in view of accuracy and efficiency of search.

When the music and the like presented by the audio data includes language information such as lyrics, dialogue, and the like, "language" is the information showing a type of the language.

"Situation" is the information showing a situation suitable for the music and the like presented by the audio data. It is possible to provide a plurality of pieces of information to show the situation, in addition to one piece of information. Also as to the "situation", it is preferable for the user to simply select a situation from a plurality of previously prepared pieces of information showing situations and to add the situation in view of accuracy and efficiency of search.

"Contents" are the information for explaining the contents of the music and the like presented by the audio data.

"Keyword" is the information showing a keyword for search and can be input using a free sentence (for example, a word-level). Although it is needless to say that a relatively long sentence may be input as a keyword, a word-level keyword is preferable because it is used as a keyword for search. A plurality of pieces of informations may be added (provided) as "contents" and "keyword".

In the example shown in FIG. 3A, the pertinent audio data is added with the respective pieces of information of "release date (Aug. 8, 1981), "release country" (USA), "artist" (XXXXXXX), "album name" (YYYYY), "title [music name]" (ZZZZZ), "genre" (Jazz), and "language" (nil). Further, in the example shown in FIG. 3A, the respective pieces of information of "situation", "contents", and "keyword" are added, and a plurality of pieces of information are added to each of "situation", and "keyword".

Further, in the example shown in FIG. 3B, the audio data is added with the respective pieces of information of "release date" (Nov. 20, 2003), "release country" (Japan), "artist" (LLLLLL), "album name" (MMMM), "title [music name]" (NNN), "genre" (Rock), and "language" (Japanese). Further, in the example shown in FIG. 3B, the respective pieces of information of "situation", "contents", and "keyword" are added, and a plurality of pieces of information are added to each of "situation" and "keyword".

Note that audio data is music data in many cases as described above, and metadata to be added to the music data is produced and presented by a provider of the music data such as a music production firm and the like. Thus, when music data is received through the external I/F 24 and the external input/output terminal 25 or through The Internet 100 connected through the network I/F 23, the metadata added to the music data can be also received.

Further, the music data and the metadata added therewith are caused to correspond with each other in a relation of 1:1 by predetermined identification information (identification ID) such as ISRC (International Standard Recording Code) and the like. The music data, which is already accumulated in the material database 21 and which is not added with metadata, can be provided with only the metadata of target music data using the identification information through the external I/F 24 and the external input/output terminal 25 or through The Internet 100 connected through the network I/F 23 so that the metadata can be added to the music data accumulated in the material database 21.

Further, the user inputs metadata to the music data without metadata through the external equipment such as the personal computer and the like or through the key operating unit 62 of the contents replay apparatus of the embodiment so that the metadata is added to target music data. The music data in this case includes not only commercially available music data but also the music data played and recorded by the user and the like.

Further, the audio data includes not only the music data as described above but also contents of a spoken voice such as comic story telling, reading, and lecture, contents composed of a spoken voice and music, and contents of various types of sounds such as a surf sound, a falling rain sound, a sound of trees when they sway in the wind, a vehicle engine noise, and the like. Metadata is also added to the various types of audio data described above other than the music data likewise the music data explained using FIG. 3A to FIG. 3B and used.

As described above, metadata is added to the image data such as the still image data, the moving image data, and the like and to the audio data such as the music data and the like so that the audio data can be automatically related to the image data using the metadata.

[Specific Example for Relating Audio Data to Image Data]

Figure 4A:
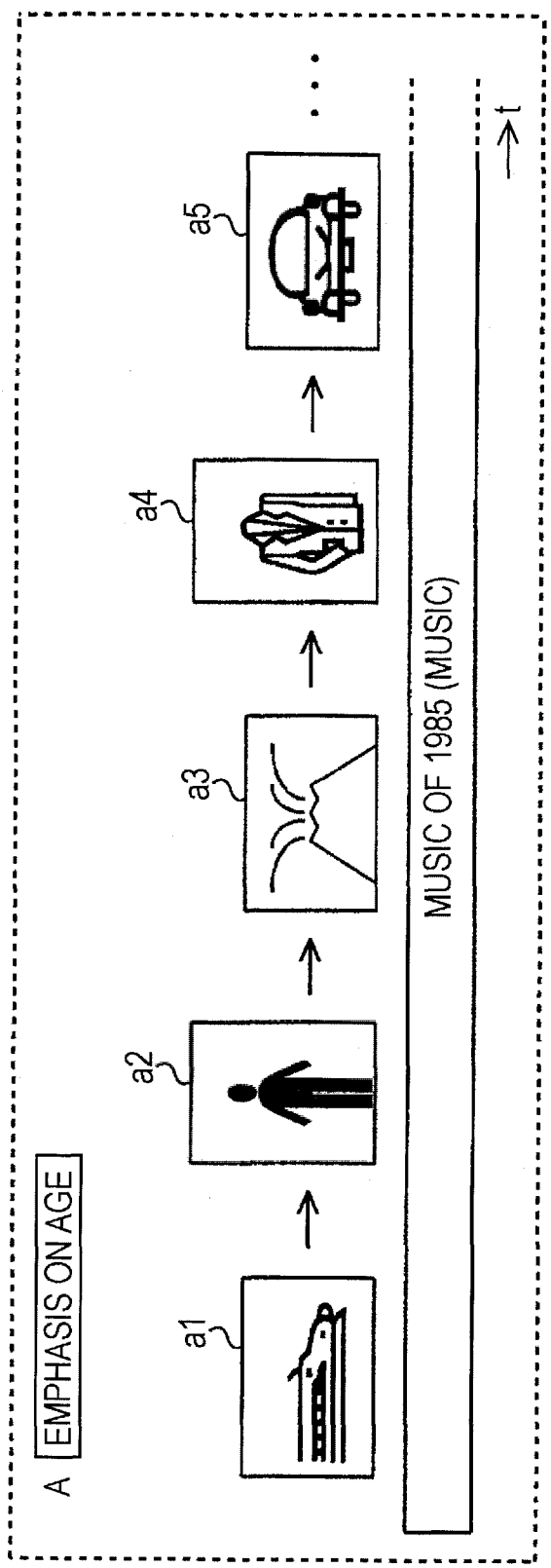
FIG. 4A is a view explaining an example of a contents replay mode of the contents replay apparatus shown in FIG. 1.

Next, a specific example for automatically relating audio data to image data and replaying the data will be explained. FIG. 4A to FIG. 4B are views showing the specific example when the audio data is related to the image data and the audio data and the image data is replayed, wherein the direction shown by an arrow shows a direction in which a time t passes.

It may be desired, for example, to listen to nostalgic music while displaying the photographs, through which events occurred when the music was released can be remembered, in a slideshow. In this case, the user of the contents replay apparatus of the embodiment makes a setting for instructing the contents replay apparatus to search still image data to be related to the audio data to be replayed putting emphasis on age through the key operating unit 62 and replays the audio data of target music.

In this case, the controller 10 of the contents replay apparatus of the embodiment searches the metadata added to the still image data from a lot of still image data accumulated in various types of material servers on The Internet 100 based on the metadata added to the replayed audio data, further extracts still image data related to various events occurred when the audio data to be replayed was released, and further also searches and extracts photographs and snaps of travel picked up by the user around that time.

Although it is assumed in the above explanation that image data searched through the material servers on The Internet 100 is different from that searched through the material database 21, the present invention is not limited thereto. It is needless to say that the material servers on The Internet 100 and the material database 21 may search image data under the same condition, and further any one of the material servers on The Internet 100 and the material database 21 may be used for search.

When a plurality of still images resulting from the plurality of still image data extracted as described above are replayed in correspondence to the audio data to be replayed, the still images related to the audio data to be replayed can be replayed and displayed.

When, for example, the audio data of music, which is shown in FIG. 4A and was released in 1985, is replayed, the audio data is replayed through the audio decoder 32, the audio D/A converter 51, the audio amplifier 52, and the speaker 53 as described above. At the same time, still image data as to the various events occurred in 1985 are extracted from the material servers on The Internet 100 and the material database 21 under the control of the controller 10, and still images a1, a2, a3, a4, a5, . . . is displayed through the image decoder 31, the video D/A converter 41, and the display 42 during a predetermined time (for example, several seconds), respectively in FIG. 4A.

Note that the still images a1, a2, a3, a4, a5 shown in FIG. 4A relate to the events occurred in 1985. That is, the still image a1 uses a high speed railway partially opened at that time as a subject, the still image a2 uses the man in charge of a serious incident as a subject, the still image a3 uses an overseas volcano erupted at that time as a subject, the still image a4 uses clothes which became fashionable at that time as a subject, and the still image a5 uses a vehicle which became topics at that time as a subject.

Further, when pieces of music of the same age are sequentially replayed, it lacks freshness to display the same still images in the same sequence. To cope with this problem, it is also possible to extract still images more suitable for the pieces of music to be replayed by providing the image data to be extracted with variation by, for example, employing random numbers or using a situation, a keyword, and the like as parameters at the same time.

Further, as another example, there is, for example, a case in which it is intended to more pump up a Christmas party by listening to a Christmas song in the Christmas party while displaying photographs related to Christmas as if a slideshow is carried out. In this case, the user of the contents replay apparatus of the embodiment makes a setting for instructing the contents replay apparatus to search still image data to be related to the audio data to be replayed putting emphasis on situation through the key operating unit 62 and replays the audio data of target music.

In this case, the controller 10 of the contents replay apparatus of the embodiment searches the metadata added to the still image data from a lot of still image data accumulated in the various types of material servers on The Internet 100 based on "situation" of "Christmas" and "keyword" of "party" of the metadata added to the replayed audio data of Christmas song, extracts still image data that agrees with "situation" and "keyword" of the music data to be replayed, and further searches and extracts also photographs and snaps of travel picked up by the user around that time.

It is possible to replay and display a plurality of still images that result from the plurality of thus extracted still image data in relation to the audio data to be replayed by replaying them in correspondence to the replay of the audio data to be replayed.

When it is intended to replay, for example, a Christmas song as shown in FIG. 4B, pertinent audio data is replayed through the audio decoder 32, the audio D/A converter 51, the audio amplifier 52, and the speaker 53 as described above. At the same time, still image data whose situation relates to Christmas is extracted from the material servers on The Internet 100 and from the material database 21 of the contents replay apparatus under the control of the controller 10 and still images b1, b2, b3, b4, . . . are displayed through the image decoder 31, the video D/A converter 41, and the display 42 during a predetermined time (for example, several seconds), respectively in FIG. 4B.

Note that the situations of the still images b1, b2, b3, b4 shown in FIG. 4B relate to Christmas, and the still image b1 uses a Christmas tree as a subject, the still image b2 uses a Christmas cake as a subject, the still image b3 uses the atmosphere of a Christmas party as a subject, and the still image b4 uses a Christmas tree as a subject.

Further, when various types of Christmas songs are sequentially replayed also in this case, it lacks freshness to display the same still images in the same sequence. To cope with this problem, it is preferable to extract still images more suitable for the music to be replayed by providing the image data to be extracted with variation by, for example, employing random numbers or using a situation, a keyword, and the like as parameters at the same time.

Further, when the audio data of music is replayed, the case, in which still image data related to the audio data is searched and extracted, is explained here as an example. However, the present invention is not limited thereto. On the contrary, when, for example, the user designates a plurality of still image data and sequentially replay the still image data, it is also possible to automatically search and extract the audio data of music suitable for the plurality of still image data using the metadata of the still image data and to replay the audio data according to the replay of the still image data. Also in this case, it is possible to instruct metadata so that age, situation, and the like are emphasized by the metadata.

Further, when moving image data picked up by the user using a digital video camera in the past is replayed, it is possible to search and extract music which was popular at the time the moving image data was picked up and to replay the music according to the replay of the moving image data. Otherwise, it is also possible to search and extract music that agrees with the situation of the moving image data and to replay it according to the replay of the moving image data.

[As to Specific Processing when Contents are Replayed]
[As to Processing for Searching Image Data According to Audio Data to be Replayed]

Next, as explained using FIG. 4A to FIG. 4B, a processing, which is carried out to search image data according to audio data to be replayed to replay and display image data according to the audio data, will be explained in detail. Here, a case, in which the audio data to be replayed is music data accumulated in the material database 21 and the image data to be displayed is still image data such as a photograph and the like, will be explained as an example. Further, the explanation will be carried out assuming that the metadata added to the audio data to be replayed is also stored to the material database 21.

Figure 5:
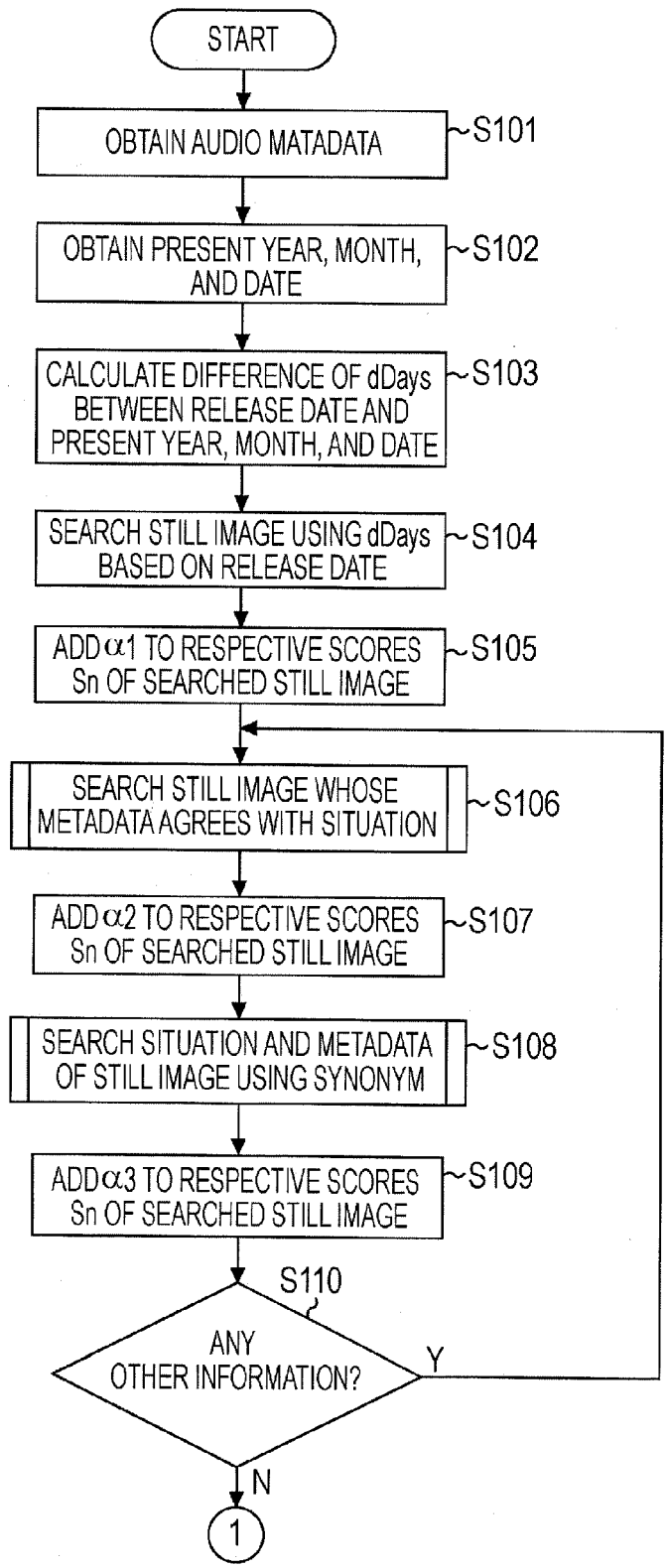
FIG. 5 is a flowchart explaining processings when a still image and a moving image related to audio data to be replayed are searched and extracted.
Figure 6:
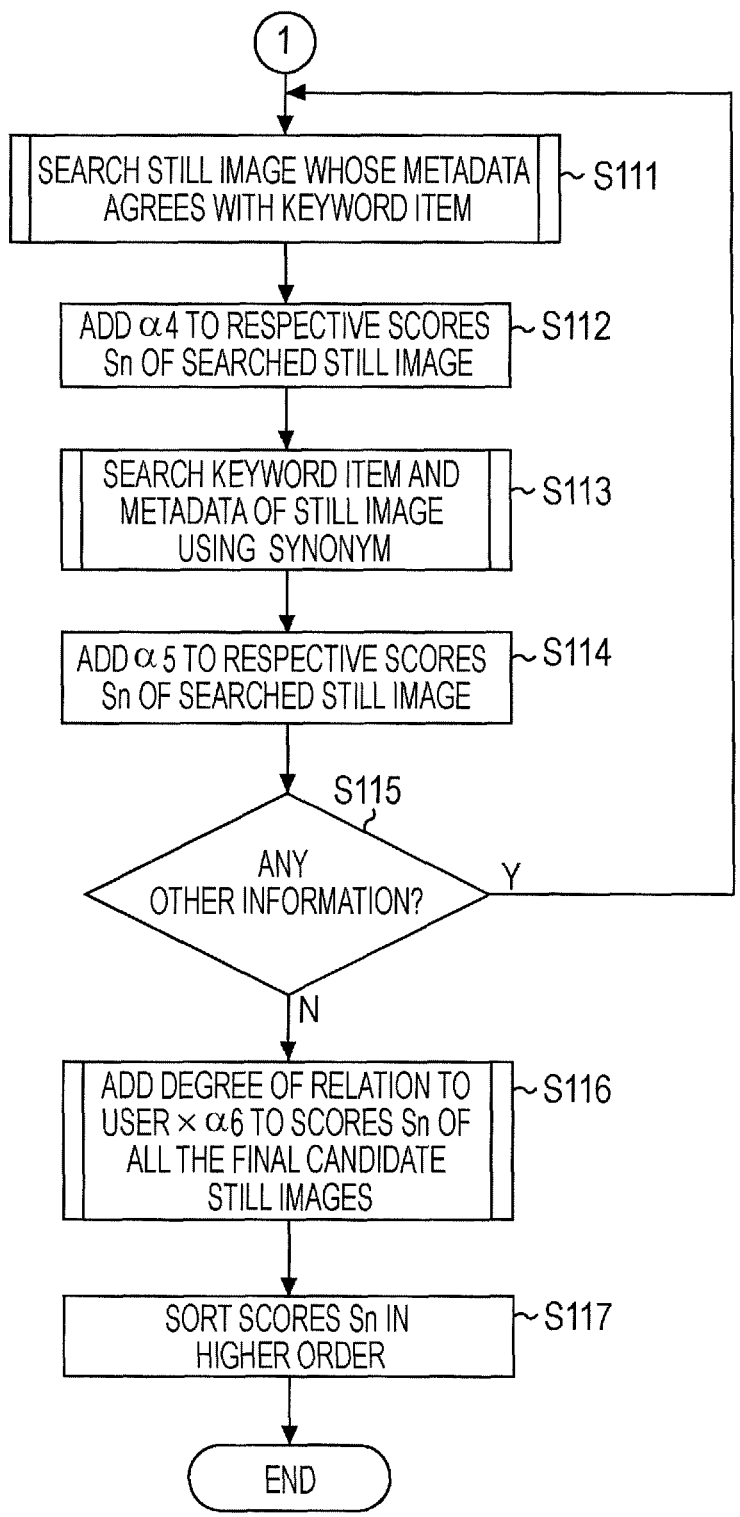
FIG. 6 is a flowchart continuous to that of FIG. 5.

FIGS. 5 and 6 are flowcharts explaining processings carried out when a still image and a moving image related to pertinent audio data are replayed when the audio data is replayed. The processings shown in FIGS. 5 and 6 are executed by the controller 10 when, for example, an input for instructing replay of the audio data is received from the user through the key operating unit 62 so that the instructed audio data is replayed.

First, the controller 10 reads and acquires the metadata added to the audio data to be replayed from the material database 21 (step S101) and acquires the present year, month, and data from the clock circuit 61 (step S102). Then, the controller 10 calculates dDays by subtracting "release date" of the metadata added to the audio data to be replayed from the present year, month, and date acquired from the clock circuit 61 (step S103). A reason why the dDays, which is the difference of the number of days between the present year, month, and date and "release date" of the audio data, is determined as described above, is to specify an optimum search range of "release date", although this will be explained later in detail.

Then, the information as to the dates such as the photographing dates and the second dates of all the metadata of the still image data in the material database 21 is searched based on the difference of the number of days dDays, and, first, candidates are extracted and held by searching still image data deeply related to "release date" (step S104). At the time, a constant α1 is added to the respective scores Sn (n dynamically varies according to the number of sheets of still image data (photographs) hit in the search) of the still image data held as the candidates (step S105). The processings from steps S102 to S105 are search processings using "release date" which are carried out to all the still image data as a target as described above.

The scores Sn are so-called registers which are different in the respective still image data searched and extracted as the candidates as also described above. That is, the score is different in the respective still image data such that the score of the still image data designated as a candidate first is "S1", and the score of the still image data designated as a next candidate is "S2".

Further, the constant α1 and constants α2, α3, . . . that appear below are used as weights which are determined by the degree of importance of the respective items of metadata. Accordingly, a constant αm (m is an integer of at least 1 and determined according to the respective items of the metadata), which is used to an item having a high degree of importance, has a large value, and an constant αm which is used to the metadata having a low degree of importance has a small value. Specifically, the weighing constant is determined to the respective items constituting the metadata such as the weighing constant to "release date" is "α1" and the weighing constant to "situation" is "α2".

It is needless to say that the weighing constants α1, α2, . . . have a different value or some of them have the same value. Further, the respective values of the weighing constants α1, α2, . . . are determined based on the information that the degree of importance of which items is to be set to a large value in response to an instruction input from the user.

Note that before a series of the search processings is carried out, the scores S1, S2, S3, . . . Sn of all the still image data are initialized to "0". As an actual processing, it is sufficient to initialize the score Sn of the still image data hit for the first time in search to "0". In the following search, processings are carried out in the same manner such that after the score Sn of still image data hit for the first time is initialized to "0", a weighing constant αm is added to the score Sn. No initialization is carried out to the score Sn of the still image data that is already hit in a previous search and the weighing constant αm is added thereto in the uninitialized state.

Next, the controller 10 extracts candidates by searching the respective items of all the metadata of the still image data in the material database 21 using the information of the items of "situation" held as the metadata of the audio data to be replayed and holds the candidates (step S106). Then, the controller 10 adds the constant a2 to the respective scores Sn of the still image data held as the candidates (step S107).

Further, the controller 10 lists candidates of synonyms of the pertinent information of "situation" using the synonym dictionary 22, extracts the candidates by carrying out a similar search to the synonyms, and holds the candidates (step S108). Then, the controller 10 adds a constant α3 to the score Sn of the extracted and held still image data (step S109).

Note that the constant α3 is ordinarily set to a value smaller than the constant α2. This is because since αm is a value for weighing as described above and the value can be changed depending on an item on which emphasis is put, it is natural to more emphasize agreement of original words than agreement of synonyms.

Since the information of "situation" added to the audio data to be replayed may have a plurality of pieces of information, it is determined whether or not there is other information as the information of the items of "situation" (step S110). When it is determined that there is still other information as the information of the items of "situation" in the determination processing at step S110, the processings from step S106 are repeated, and the processing from step S106 to step 110 are repeated as to the other information of the items of "situation". As described above, the processings from step S106 to step S110 are search processings for all the still image data carried out using the information of the items of "situation".

When it is determined in the determination processing at step S110 that there is no other information of the items of "situation", the controller 10 goes to the processings shown in FIG. 6, extracts candidates by searching the respective items of all the metadata of the still image data in the material database 21 using the items of "keyword" held as the metadata of the audio data to be replayed, and holds the candidates (step S111). Then, a constant α4 is added to the respective scores Sn of the still image data held as the candidates (step S112).

Further, the controller 10 lists candidates of synonyms of the items of "keyword" using the synonym, dictionary 22, extracts the candidates of the synonyms by carrying out a similar search, and holds the candidates (step S113). Then, the controller 10 adds a constant α5 to the score Sn of the extracted and held still image data (step S114). The constant α5 is set to a value smaller than the constant α4 likewise the relation between the constant α3 and constant α2 described above.

Since the items of "keyword" added to the audio data to be replayed may have a plurality of pieces of information, it is determined whether or not there is other information as the information of the items of "keyword" (step S115). When it is determined that there is still other information as the information of the items of "keyword" in the determination processing at step S115, the processings from step S111 are repeated, and the processings from step S111 to step S115 are repeated as to the other information of the items of "keyword". As described above, the processings from step S111 to step S115 are search processings for all the still image data carried out using the information of "keyword".

When the still image data as all the candidates are acquired as described above, a weighing coefficient a6 is multiplied to the value of "degree of relationship to the user" of the respective still image data as the candidates and added to the scores Sn of the respective still image data (step S116). Then, finally, determination is carried out such that the respective still image data are sorted in the order of a higher score Sn (step S117) and the still image data are sequentially replayed in the order of a higher score Sn and used for display, thereby the processings shown in FIGS. 5 and 6 are finished.

Then, the still image data are displayed in the order they are sorted in a slideshow mode according to the replay of the audio data to be replayed, thereby still images that is somewhat related to the music resulting from the audio data to be replayed can be automatically selected and displayed. Further, there can be employed various presentation methods such as a method of using only the photographs having a score higher than a certain level and showing them while adjusting the intervals of a slideshow according the replay time of music in placed of replaying the photographs in a sorted order.

Note that the image data may be searched by searching the material servers on The Internet. Further, the target to be searched is not limited to the still image data and moving image data may be used as the target of search, and it is also possible to replay the moving image data having a highest core Sn according to the replay of the audio data to be replayed.

Figure 7:
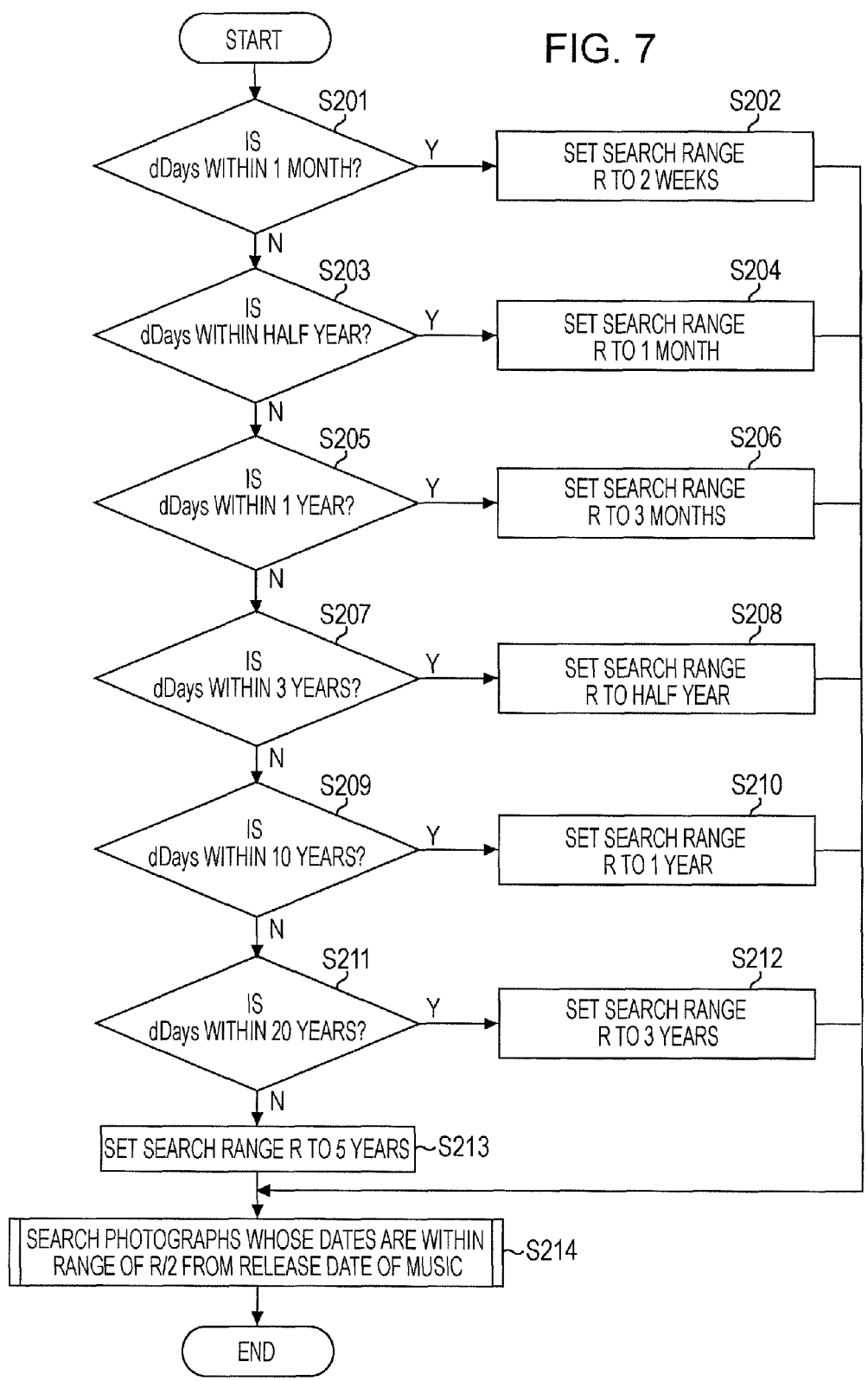
FIG. 7 is a flowchart explaining date range setting information set at step S104 shown in FIG. 5.

FIG. 7 is a flowchart explaining a processing carried out at step S104 shown in FIG. 5. In the processing, the date search range R of still image data is determined from the difference of the number of days dDays between the present year, month, and date and "release date" of audio data to be replayed. In the processing shown in FIG. 7, the search range is narrowed as the difference of the number of days dDays decreases, and, inversely, the search range is widened as the difference of the number of days dDays increases paying attention to that human remembrance becomes vague as a time passes.

That is, when a still image picked up a half year ago is used as a still image related to music released one month ago, there is a possibility that uncomfortable feeling occurs because a listener of the music is aware that the time at which the still image was picked up is apparently different from the time at which the music was released. However, even if music released 10 years ago is related to a still image picked up about one year before or after the year in which the music was released, a listener gets a feeling of "an image (photograph) of the days" with a less possibility of a discomfortable sense. Accordingly, the search range as to date can be changed according to the magnitude of the difference of the number of days dDays.

Specifically, as shown in FIG. 7, first, the controller 10 determines whether or not the difference of the number of days dDays is within one month (step S201), and when it is determined that the difference of the number of days dDays is within one month, the controller 10 sets the search range R of the information as to date to two weeks (step S202) and searches still image data within the range of R/2 from the release date of audio data, that is, within the range of one week before and after the release date (step S214), thereby the processings shown in FIG. 7 is finished.

When it is determined in the determination processing at step S201 that the difference of the number of days dDays is not within one month, the controller 10 determines whether or not the difference of the number of days dDays is within half year (step S203), and when it is determined that the difference of the number of days dDays is within half year, the controller 10 sets the search range R of the information as to date to one month (step S204) and searches still image data within the range of R/2 from the release date of audio data, that is, within the range before and after 15 days from the release date thereof (step S214), thereby the processings shown in FIG. 7 are finished.

When it is determined in the determination processing at step S203 that the difference of the number of days dDays is not within half year, the controller 10 determines whether or not the difference of the number of days dDays is within one year (step S205), and when it is determined that the difference of the number of days dDays is within one year, the controller 10 sets the search range R of the information as to date to three months (step S206) and searches still image data within the range of R/2 from the release date of audio data, that is, within the range before and after 45 days from the release date thereof (step S214), thereby the processings shown in FIG. 7 are finished.

When the controller 10 determines in the determination processing at step S205 that the difference of the number of days dDays is not within one year, the controller 10 determines whether or not the difference of the number of days dDays is within three years (step S207), and when it is determined that the difference of the number of days dDays is within three years, the controller 10 sets the search range R of the information as to date to the half year (step S208) and searches still image data within the range of R/2 from the release date of audio data, that is, within the range before and after three months from the release date thereof (step S214), thereby the processings shown in FIG. 7 are finished.

When the controller 10 determines in the determination processing at step S207 that the difference of the number of days dDays is not within three years, the controller 10 determines whether or not the difference of the number of days dDays is within 10 years (step S209), and when it is determined that the difference of the number of days dDays is within 10 years, the controller 10 sets the search range R of the information as to date to one year (step S210) and searches still image data within the range of R/2 from the release date of audio data, that is, within the range before and after 6 months from the release date thereof (step S214), thereby the processings shown in FIG. 7 are finished.

When the controller 10 determines in the determination processing at step S209 that the difference of the number of days dDays is not within 10 years, the controller 10 determines whether or not the difference of the number of days dDays is within 20 years (step S211), and when it is determined that the difference of the number of days dDays is within 20 years, the controller 10 sets the search range R of the information as to date to three years (step S212) and searches still image data within the range of R/2 from the release date of audio data, that is, within the range before and after one year and 6 months from the release date thereof (step S214), thereby the processings shown in FIG. 7 are finished.

When the controller 10 determines in the determination processing at step S211 that the difference of the number of days dDays is not within 20 years, the controller 10 sets the search range R of the information as to date to 5 years (step S213) and searches still image data within the range of R/2 from the release date of audio data, that is, within the range before and after 2 year and 6 months from the release date thereof (step S214), thereby the processings shown in FIG. 7 are finished.

As described above, when audio data to be replayed was released at a time considerably before the present time, the search range of the information as to date such as photographing date and the like included in the metadata of image data is widened so that a search can be carried out with flexibility in the search range making use that human remembrance becomes vague as a time passes. As a result, since image data can be searched in a state that agrees with the characteristics of human remembrance, an image resulting from the thus searched image data can be presented.

Note that the step sizes of the difference of the number of days dDays and the search range R are not limited to those explained using FIG. 7 and may be changed to various values. Further, seven steps are employed according to a branch condition in the example shown in FIG. 7, the step sizes may be mathematically determined using a calculation formula such as search range R=(dDays*dDays)/C (C is a predetermined constant) and the like in proportional to the square of the difference of the number of days dDays.

[As to Processing for Searching Audio Data According to Image Data to be Replayed]

Next, contrary to the explanation made using FIGS. 5 to 7, a processing for searching audio data related to image data to be replayed to replay the audio data related to the image data will be explained in detail. Here, the explanation will be carried out assuming that the image data to be replayed is image data accumulated in the material database 21 and the audio data to be searched is also accumulated in the material database 21.

Note that, as explained below, a processing for searching audio data such as music and the like related to the image data to be replayed is also basically the same as the processing, which is explained using FIGS. 5 to 7, for searching image data related to the audio data to be replayed, although the type and the number of the items of the metadata used for the search are different.

Figure 8:
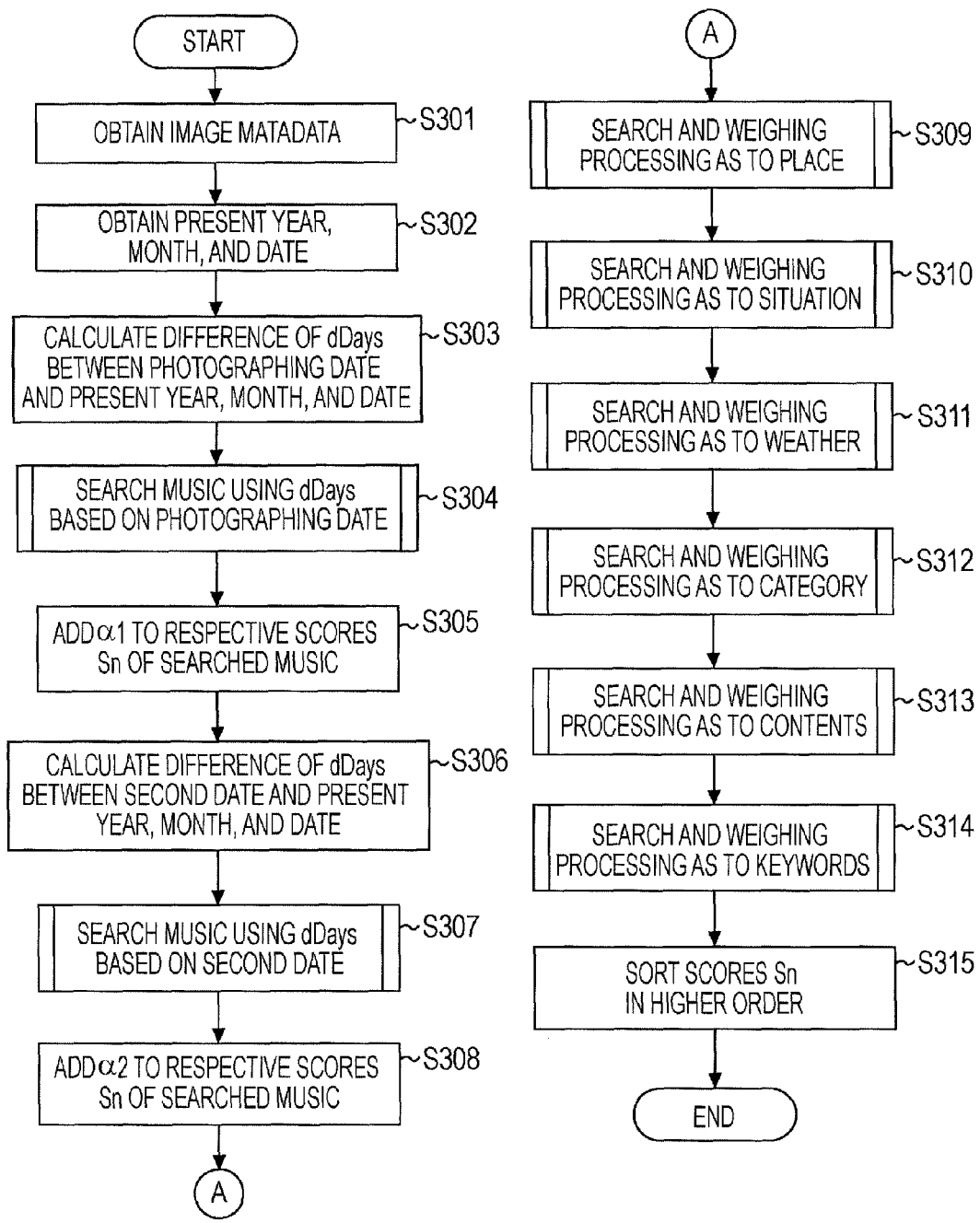
FIG. 8 is a flowchart explaining a processing when audio data related to an image to be replayed is searched and extracted.
Figure 9:
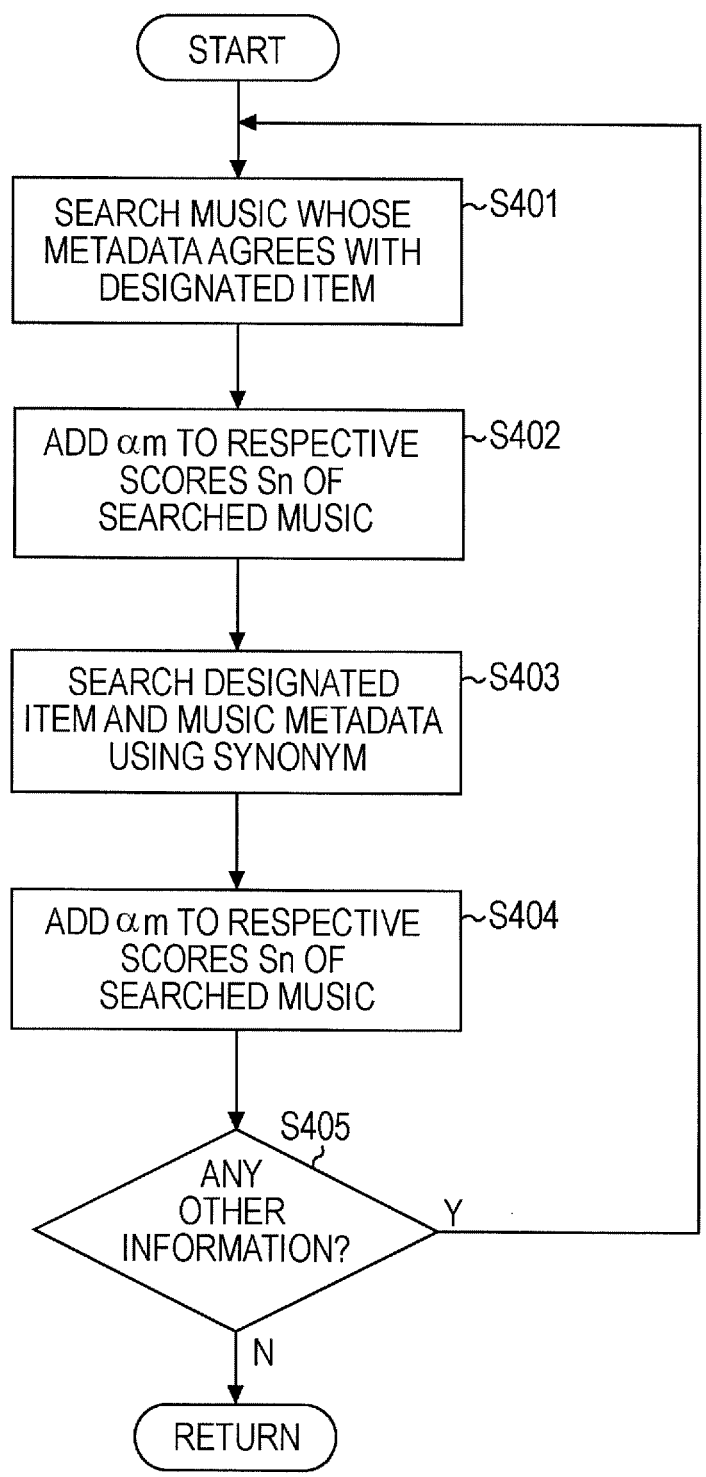
FIG. 9 is a view explaining processings carried out at steps S309 to step S314 shown in FIG. 8.

FIGS. 8 and 9 are flowcharts explaining processings carried out when music data such as music and the like related to the image data are searched and extracted when the image data is replayed. The processings shown in FIGS. 8 and 9 are executed by the controller 10 when, for example, an input for instructing replay of the image data is received from the user through the key operating unit 62 so that the instructed image data is replayed. Here, the image data may be any of still image data and moving image data, and when the image data is the still image data, it may be a plurality of still images.

Then, the controller 10 reads and acquires the metadata added to the image data to be replayed from the material database 21 (step S301) and acquires the present year, month, and data from the clock circuit 61 (step S302). Then, the controller 10 calculates dDays by subtracting "photographing date" of the metadata added to the image data to be replayed from the present year, month, and date acquired from the clock circuit 61 (step S303). A reason why the dDays, which is the difference of the number of days between the present year, month, and date and "photographing date" of the image data, is determined as described above is to specify an optimum search range of "photographing date".

Then, the information (metadata) as to the dates such as "release dates" of all the metadata of the audio data in the material database 21 is searched based on the difference of the number of days dDays, and, first, candidates are extracted and held by searching audio data deeply related to "photographing date" first, and the candidates are held (step S304). At the time, the constant α1 is added to the respective scores Sn (n dynamically varies according to the number of audio data (number of pieces of music) hit in the search) of the audio data held as the candidates (step S305).

In this case, the scores Sn are so-called registers which are different in the respective audio data which are searched and extracted as the candidates as also described above. That is, the core is different in the respective audio data such that the score of the audio data designated as a candidate first is "S1", and the score of the audio data designated as a next candidate is "S2". Further, the constant α1 and the constants α2, α3, . . . that appear below are used as weights which are determined by the degree of importance of the respective items of metadata. Accordingly, the constant αm (m is an integer of at least 1 and determined according to the respective items of the metadata), which is used to an item having a high degree of importance, has a large value, and the constant am which is used to the metadata having a low degree of importance has a small value. As described above, the processings from steps S302 to S305 are search processings carried out to all the audio data as a target using "photographing date".

Next, the controller 10 calculates dDays by subtracting "second time and date" of the metadata added to the image data to be replayed from the present year, month, and date acquired from the clock circuit 61 at step S302 (step S306). A reason why the dDays, which is the difference of the number of days between the present year, month, and date and "second time and date" of the image data is determined as described above, is to specify an optimum search range of "second time and date" likewise "photographing date.

Then, the information (metadata) as to the dates such as the release dates and the like of all the metadata of the audio data in the material database 21 is searched based on the difference of the number of days dDays, and, first, candidates are extracted and held by searching audio data deeply related to "second date and time" (step S37). Then, the constant α2 is added to the respective scores Sn of the audio data held as the candidates (step S308). As described above, the processings from steps S306 to S308 are search processings carried out to all the audio data as a target using "second date and time".

Then, the controller 10 also subjects the respective items of the metadata added to usable audio data to search and weighing processings likewise "photographing date" and "second time and date" described above as to the respective items of the metadata added to the image data to be replayed. That is, the controller 10 searches the information as to the places of all the metadata of the audio data in the material database 21 based on the information of "place" in the metadata added to the image data to be replayed, extracts the audio data deeply related to "places", and carries out a weighing processing to each of the extracted audio data (step S309).

The controller 10 searches the information as to the situations of all the metadata of the audio data in the material database 21 based on the information of "situation" in the metadata added to the image data to be replayed, extracts the audio data deeply related to "situations", and carries out weighing to each of the extracted audio data (step S310).

The controller 10 searches the information as to the weathers of all the metadata of the audio data in the material database 21 based on the information of "weather" in the metadata added to the image data to be replayed, extracts the audio data deeply related to "weathers", and carries out weighing to each of the extracted audio data (step S311).

The controller 10 searches the information as to the categories of all the metadata of the audio data in the material database 21 based on the information of "category" in the metadata added to the image data to be replayed, extracts the audio data deeply related to "categories", and carries out a weighing processing to each of the extracted audio data (step S312).

The controller 10 searches the information as to the contents of all the metadata of the audio data in the material database 21 based on the information of "content" in the metadata added to the image data to be replayed, extracts the audio data deeply related to "contents", and carries out a weighing processing to each of the extracted audio data (step S313).

Further, the controller 10 searches the information as to the keywords of all the metadata of the audio data in the material database 21 based on the information of "keyword" in the metadata added to the image data to be replayed, extracts the audio data deeply related to "keywords", and carries out a weighing processing to each of the extracted audio data (step S314).

As described above, all the audio data, which are extracted as the audio data deeply related to the image data to be replayed are sorted (rearranged) in the order of a higher score Sn (step S315), thereby the processings shown in FIG. 8 are finished. Then, the controller 10 replays music data in the order of a higher score Sn according to the replay of the image data to be replayed.

Next, a specific example of the search and weighing processings executed to the respective items at steps S309 to step S314 shown in FIG. 8 will be explained with reference to a flowchart of FIG. 9. FIG. 9 is the flowchart explaining the specific example of the processings executed at the respective steps of step S309 to step S314 shown in FIG. 8. In FIG. 9, a designated item means a pertinent item (which is designated (instructed) as a target to be processed in the metadata) in "place", "situation", "weather", "category", "contents", and "keyword" which are the items constituting the metadata added to the image data and means the items of the metadata designated at step S309 to step S314 of the processings (main processings) shown in FIG. 8.

Then, at the respective steps of steps S309 to step S314, first, the respective items of all the metadata of the audio data accumulated in the material database 21 are searched based on the designated items at the steps of the main processings, audio data deeply related to the information of the designated items are extracted (step S401), and the scores Sn of the audio data are weighed using the weighing constant αm (step S402).

Next, the controller 10 lists candidates of synonyms of the information of the designated items at the steps of the main processings using the synonym dictionary 22, searches the respective items of all the metadata of the audio data accumulated in the material database 21 based on respective synonyms, extracts the audio data deeply related to the synonyms as to the information of the designated items (step S403), and weighs the scores of the respective extracted audio data (step S404).

Since a plurality of pieces of information may be added to the designated items, the controller 10 determines whether or not the designated items have other information (step S405). When the controller 10 determines in the determination processing at step S405 that the designated items have other information, the other information is also subjected to the processings from step S401.

Further when the controller 10 determines in the determination processing at step S405 that the designated items have not any other information, the controller 10 finishes the processings shown in FIG. 9 and returns to the step at which the processings shown in FIG. 8 are read out so that the next steps of the main processings are executed.

As described above, as to the information of the respective items except "photographing date" and "second time and date" in the metadata added to the image data, the metadata added to the audio data are searched as to the information and the synonyms of the information, and the music data related to the image data to be replayed are extracted and can be replayed according to the replay of the image data.

Note that when the image data to be replayed is a plurality of still image data for replaying a so-called slideshow, so-called macro metadata is created based on the metadata added to each of the plurality of still image data, and audio data having a high score can be used by executing the search and weighing processing, which is explained using FIGS. 8 and 9, by the use of the macro metadata. That is, it is possible to regard the plurality of still image data as a series of image data in the entirety thereof and to cause one or a plurality of audio data to correspond to the plurality of audio data.

Further, it is of course possible to search one audio data in correspondence to each of the plurality of still image data. Further, when the image data to be replayed is moving image data, it is also possible to extract one relating audio data using the metadata added to the moving image data and to replay the extracted audio data or to extract at least two relating audio data and to sequentially replay the audio data.

As described above, conventionally, a still image picked up, for example, by a digital still camera and a moving image and the like picked up by a digital video camera cannot be automatically coupled with audio data acquired through a communication network such as The Internet and the like and through a recording medium such as an MD, a CD and the like. Accordingly, when it is intended to replay image data and audio data acquired through different paths as described above in relation to each other, the user cannot help instructing the timing and the sequence of replay of the image data and audio data to be replayed in detail.

However, in the contents replay apparatus of the embodiment described above, when a sound is reproduced, various images relevant to the sound can be automatically presented as still images and moving images such as photographs and the like in relation with the age, the place, and the contents of the sound. Accordingly, it is not necessary for the user to expressly search a photograph or to make a slideshow accompanying with BGM, and further even if the amount of still image data such as a photograph and the like increase, the still image data such as the photograph and the like is automatically added as a target to be subjected to processing.

Further, the contents replay apparatus of the embodiment described above can replay audio data and image data after they are related to each other automatically and properly using the detailed metadata added thereto. Accordingly, it is possible to dredge up personal contents sleeping in the material database 21 and in the material server 101 and the like on The Internet 100 and to replay them so that the memories of the user can be dredged up by dredging the personal contents, thereby a more deep sense of excitement and nostalgia can be created. That is, the contents replay apparatus of the embodiment described above is to be called a memory retrieving player.

Although it is described in the above embodiment that when emphasis is put on age, the information as to date such as "pick-up date", "second time and date", "release date" of the metadata is used, and when emphasis is put on situation, "situation" of the metadata is used, the present invention is not limited thereto. It is of course possible to use the other items of the metadata, for example, "place", "weather", "photographer", "accompanying person", and the like as to image data and to use "artist", "album name", "title", "language" and the like as to audio data.

Further, it is possible to carry out various modes of search by combining a plurality of items constituting the metadata. In this case, it is sufficient to provide several items to be selected such as, "emphasis put on place", "emphasis put on weather", or "emphasis put on artist" likewise "emphasis put on age" and "emphasis put on situation" described above, and to set the items of the metadata which are used in the respective items. Further, it is also possible for the user to designate the items and the degree of importance of the metadata used to search.

Further, as also described above, the content replay apparatus of the embodiment may be arranged as a dedicated content replay apparatus, in addition to that it may be applied to a personal computer, a note type personal computer, a mobile phone terminal, and a mobile information terminal.

What is claimed is:

1. A computer-readable storage device storing instructions which, when executed, cause a computer to perform a method comprising:
   searching first metadata associated with data objects of a first kind for portions of the first metadata matching second metadata associated with data objects of a second kind;
   identifying matching data objects from the searching, wherein the matching data objects comprise data objects of the first kind associated with the portions of the first metadata matching the second metadata;
   assigning scores to the respective matching data objects, wherein the score assigned to a matching data object depends on which portion of the second metadata matches the portion of the first metadata associated with the matching data object;
   using the scores assigned to the matching data objects identified from the searching to select, from the matching data objects, a subset of the matching data objects; and
   presenting the data object of the second kind and the subset of matching data objects in relation to each other.

2. The computer-readable storage device of claim 1, wherein:
   the data object of the second kind comprises audio data; and
   the data objects of the first kind comprise image data.

3. The computer-readable storage device of claim 2, wherein the second metadata comprise a release date, a release location, an artist name, a title, a genre, a language, a keyword, and/or information regarding content of the audio data.

4. The computer-readable storage device of claim 2, wherein:
   the first metadata comprise a date and/or a time associated with the image data;
   the second metadata comprise a date and/or a time associated with the audio data; and
   the presenting comprises playing the audio data and displaying the image data.

5. The computer-readable storage device of claim 4, wherein searching the first metadata associated with the data objects of the first kind comprises:
   setting a search range comprising a period of time, the period of time depending on the date and/or the time associated with the audio data; and
   determining whether a portion of the first metadata includes a date and/or time within the search range.

6. The computer-readable storage device of claim 1, wherein:
   the data object of the second kind comprises image data; and
   the data objects of the first kind comprise audio data.

7. The computer-readable storage device of claim 6, wherein the second metadata comprise a time, a date, a location, a weather condition, a name, a relationship between the image data and a user, a category, a keyword, and/or information regarding content of the image data.

8. The computer-readable storage device of claim 6, wherein:
   the first metadata comprises comprise a date and/or a time associated with the audio data;
   the item of the second metadata comprise a date and/or a time associated with the image data; and
   the presenting comprises playing the audio data and displaying the image data.

9. The computer-readable storage device of claim 1, wherein:
   using the scores to select the subset of matching data objects comprises determining whether a first score of a first of the matching data objects exceeds a second score of a second of the matching data objects, and
   presenting the data object of the second kind and the subset of matching data objects in relation to each other comprises:
      when it is determined that the first score exceeds the second score, presenting the first matching data object in relation to the data object of the second kind prior to presenting the second matching data object in relation to the data object of the second kind, and
      when it is determined that the second score exceeds the first score, presenting the second matching data object in relation to the data object of the second kind prior to presenting the first matching data object in relation to the data object of the second kind.

10. The computer-readable storage device of claim 1, wherein a first portion of the second metadata is associated with a user-assigned weight, wherein a first of the matching data objects is associated with a portion of the first metadata matching the first portion of the second metadata, and wherein the score assigned to the first matching data object includes the user-assigned weight.

11. The computer-readable storage device of claim 1, wherein the method further comprises using the scores assigned to the subset of matching data objects to determine an order of presentation of the subset of matching data objects.

12. An apparatus comprising:
   a communication interface;
   a memory configured to store processor-executable instructions; and
   a processing circuit coupled to the communication interface and the memory and configured to execute the instructions to perform a method comprising:
      searching first metadata associated with data objects of a first kind for portions of the first metadata matching second metadata associated with data objects of a second kind;
      identifying matching data objects from the searching, wherein the matching data objects comprise data objects of the first kind associated with the portions of the first metadata matching the second metadata;
      assigning scores to the respective matching data objects, wherein the score assigned to a matching data object depends on which portion of the second metadata matches the portion of the first metadata associated with the matching data object;
      using the scores assigned to the matching data objects identified from the searching to select, from the matching data objects, a subset of the matching data objects; and
   presenting the data object of the second kind and the subset of matching data objects in relation to each other.

13. The apparatus of claim 12, wherein:
the data object of the second kind comprises audio data;
the data objects of the first kind comprise image data;
the first metadata comprise a date and/or a time associated with the image data;
the second metadata comprise a date and/or a time associated with the audio data; and
the presenting comprises playing the audio data and displaying the image data.

14. The apparatus of claim 13, wherein searching the first metadata associated with the data objects of the first kind comprises:
setting a search range comprising a period of time, the period of time depending on the date and/or the time associated with the audio data; and
determining whether a portion of the first metadata includes a date and/or time within the search range.

15. The apparatus of claim 12, wherein:
the data object of the second kind comprises image data;
the data objects of the first kind comprise audio data;
the first metadata comprise a date and/or a time associated with the audio data;
the second metadata comprise a date and/or a time associated with the image data; and
the presenting comprises playing the audio data and displaying the image data.

16. The apparatus of claim 12, wherein:
using the scores to select the subset of matching data objects comprises determining whether a first score of a first of the matching data objects exceeds a second score of a second of the matching data objects, and
presenting the data object of the second kind and the subset of matching data objects in relation to each other comprises:
when it is determined that the first score exceeds the second score, presenting the first matching data object in relation to the data object of the second kind prior to presenting the second matching data object in relation to the data object of the second kind, and
when it is determined that the second score exceeds the first score, presenting the second matching data object in relation to the data object of the second kind prior to presenting the first matching data object in relation to the data object of the second kind.

17. The apparatus of claim 12, wherein a first portion of the second metadata is associated with a user-assigned weight, wherein a first of the matching data objects is associated with a portion of the first metadata matching the first portion of the second metadata, and wherein the score assigned to the first matching data object includes the user-assigned weight.

18. The apparatus of claim 12, wherein the method further comprises using the scores assigned to the subset of matching data objects to determine an order of presentation of the subset of matching data objects.

19. A method comprising:
using a processing circuit to search first metadata associated with data objects of a first kind for portions of the first metadata matching second metadata associated with data objects of a second kind;
identifying matching data objects from the searching, wherein the matching data objects comprise data objects of the first kind associated with the portions of the first metadata matching the second metadata;
assigning scores to the respective matching data objects, wherein the score assigned to a matching data object depends on which portion of the second metadata matches the portion of the first metadata associated with the matching data object;
using the scores assigned to the matching data objects identified from the searching to select, from the matching data objects, a subset of the matching data objects; and
presenting the data object of the second kind and the subset of matching data objects in relation to each other.

* * * * *